United States Patent

Guerin et al.

[11] Patent Number: 6,048,419
[45] Date of Patent: Apr. 11, 2000

[54] COMPACTING MEANS AND DEVICE SUITABLE FOR THE COMPACTING OF MATERIALS WITH A PYROPHORIC TENDENCY

[75] Inventors: Jean-Claude Guerin, deceased, late of Elancourt; by Robert René Guerin, legal representative, Corbeil-Essonnes; Philippe Kerrien, Montigny-le-Bretonneux; Gérard Limeuil, Voisins le Bretonneux, all of France

[73] Assignee: Campagnie Generale des Matieres Nucleaires, Velizy Villaconblay, France

[21] Appl. No.: 08/814,353

[22] Filed: Mar. 11, 1997

[30] Foreign Application Priority Data

Mar. 13, 1996 [FR] France ................... 96 03137

[51] Int. Cl.[7] ................ B32B 9/00; A62D 3/00
[52] U.S. Cl. ........... 149/108.4; 264/3.1; 100/90; 100/246; 588/260
[58] Field of Search ............. 264/0.5, 3.1; 149/108.4; 100/90, 246; 588/260

[56] References Cited

U.S. PATENT DOCUMENTS

| | | | |
|---|---|---|---|
| 3,829,537 | 8/1974 | Rosenthal | 264/3 R |
| 4,416,197 | 11/1983 | Kehl | 100/246 |
| 4,435,481 | 3/1984 | Baldi | 102/336 |
| 4,768,430 | 9/1988 | Yamamoto et al. | 100/246 |
| 4,778,626 | 10/1988 | Ramm et al. | 264/0.5 |
| 4,884,601 | 12/1989 | Hatakeyama et al. | 100/90 X |
| 4,897,222 | 1/1990 | Muntzel et al. | 100/229 R X |
| 5,093,076 | 3/1992 | Young et al. | 419/12 |
| 5,194,219 | 3/1993 | Baldi | 149/6 |
| 5,323,698 | 6/1994 | Prevost | 100/246 |
| 5,354,519 | 10/1994 | Kaeser | 264/3.1 |
| 5,592,027 | 1/1997 | Jacq et al. | 264/0.5 |

FOREIGN PATENT DOCUMENTS

| | | |
|---|---|---|
| 124185 | 11/1984 | European Pat. Off. . |
| 2243136 | 3/1974 | Germany . |
| 56-087605 | 7/1981 | Japan . |
| 59-030775 | 2/1984 | Japan . |
| 60-092098 | 5/1985 | Japan . |

*Primary Examiner*—Peter A. Nelson
*Attorney, Agent, or Firm*—Cohen, Pontani, Lieberman & Pavane

[57] ABSTRACT

The present invention relates to a compacting process suitable particularly for the compacting of materials with a pyrophoric tendency and especially for the compacting of scrap metal generated in the nuclear industry; and compacting means (4), and a compacting device including said means (4), appropriate for the implementation of said process. In said process the blanketed materials are compacted with optimized complementary external blanketing. The inert gas used for said external blanketing is characteristically conveyed via the compacting means (4) and blown in through their lower end (15).

4 Claims, 5 Drawing Sheets

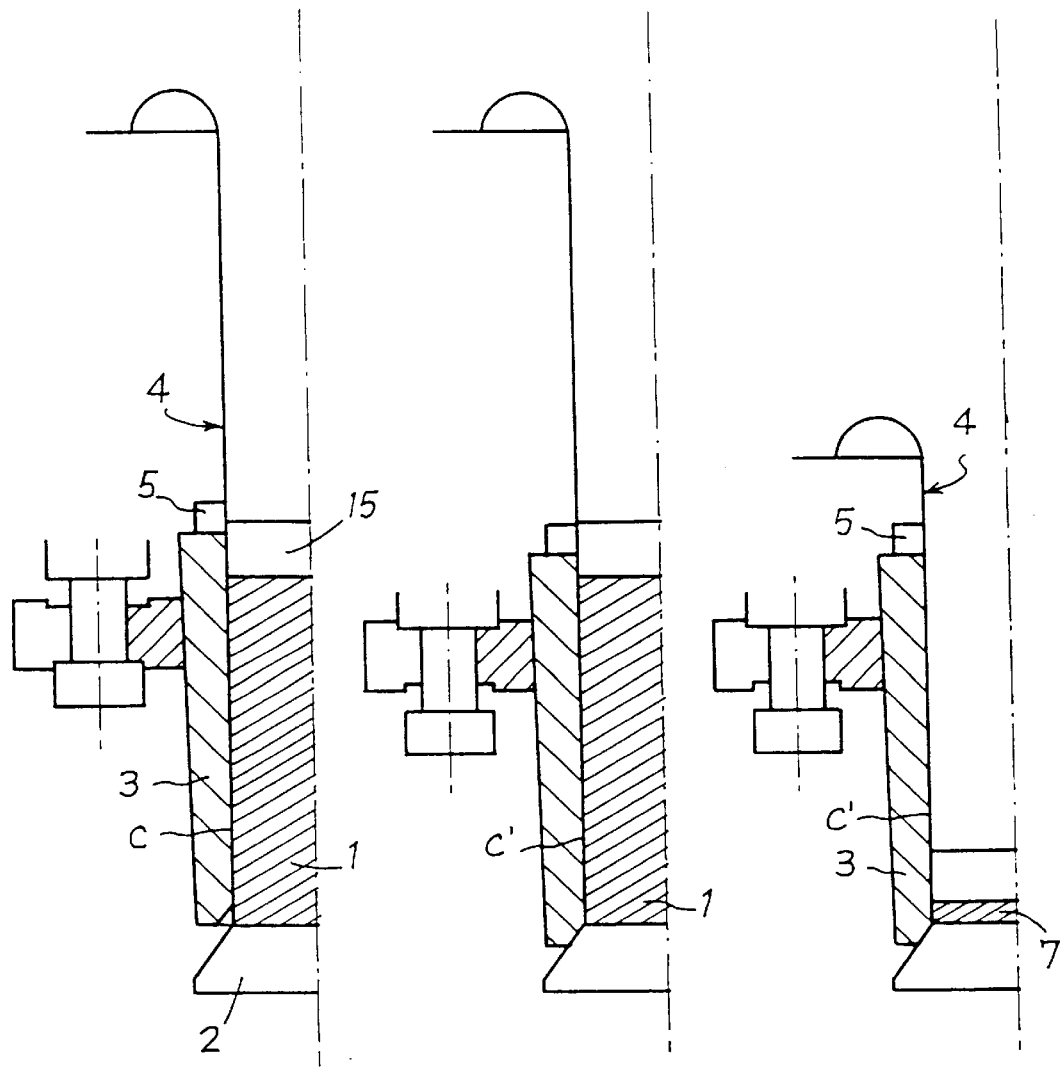
FIG_1a  FIG_1b  FIG_1c

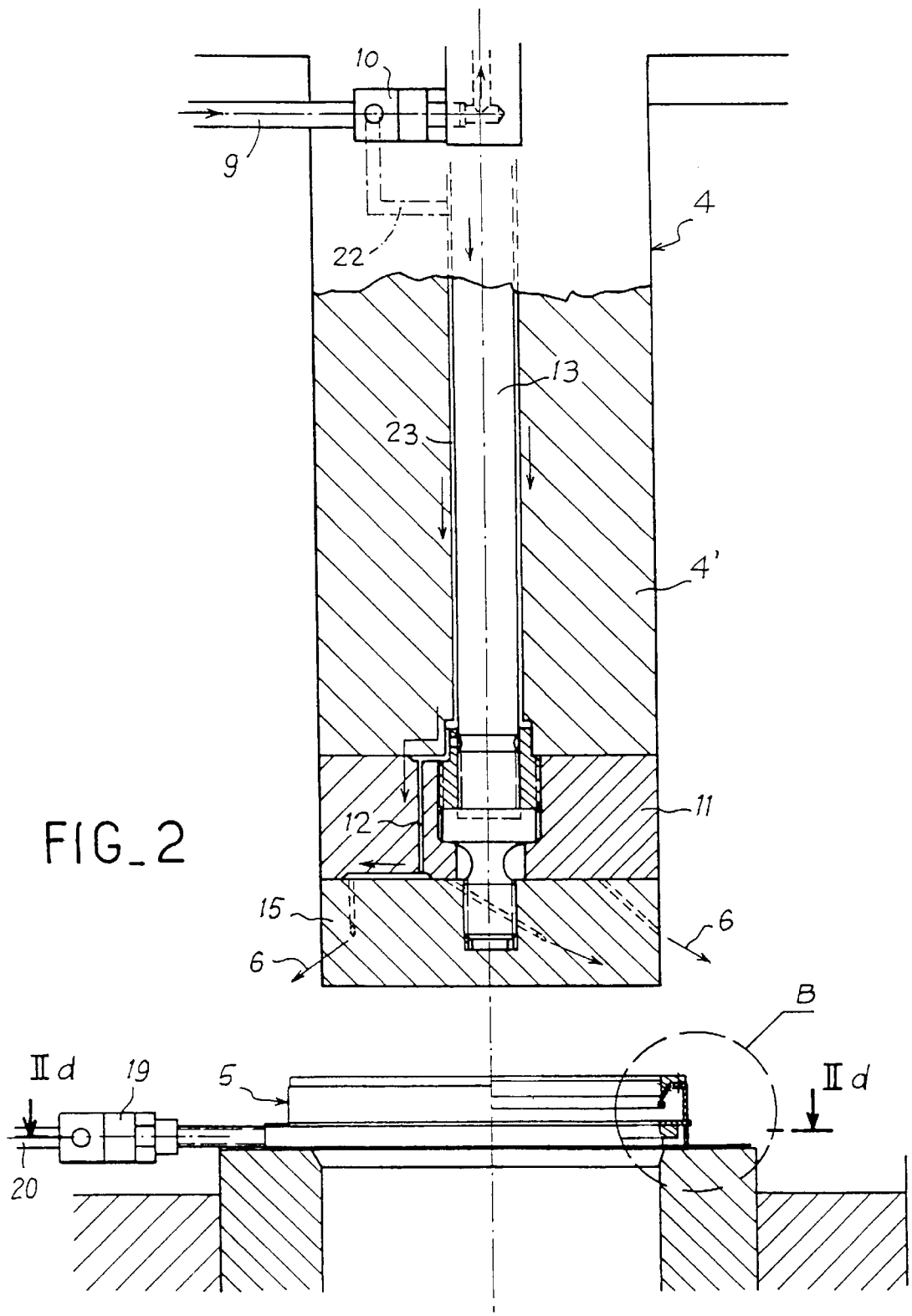
FIG_2

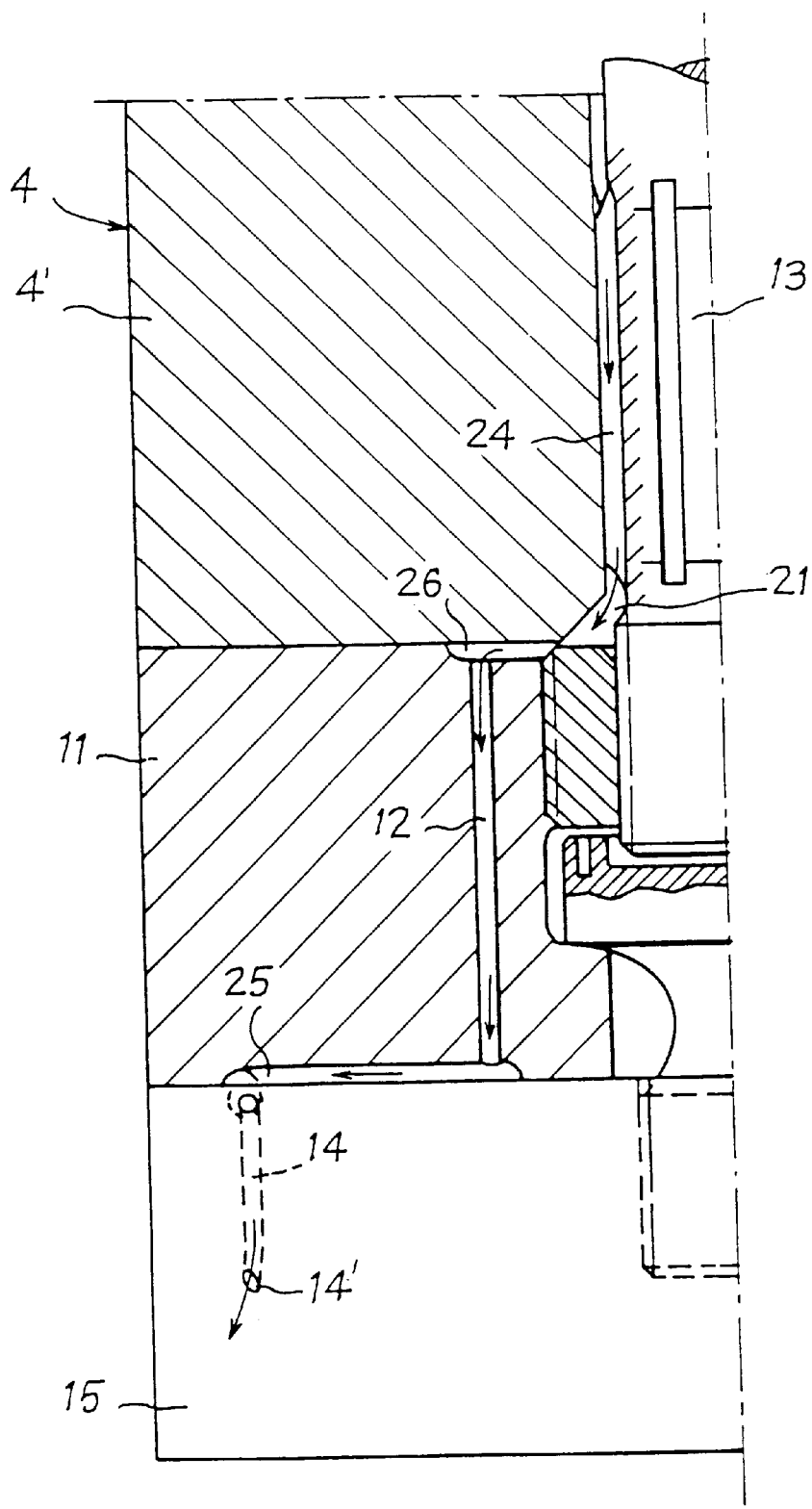
FIG_2a

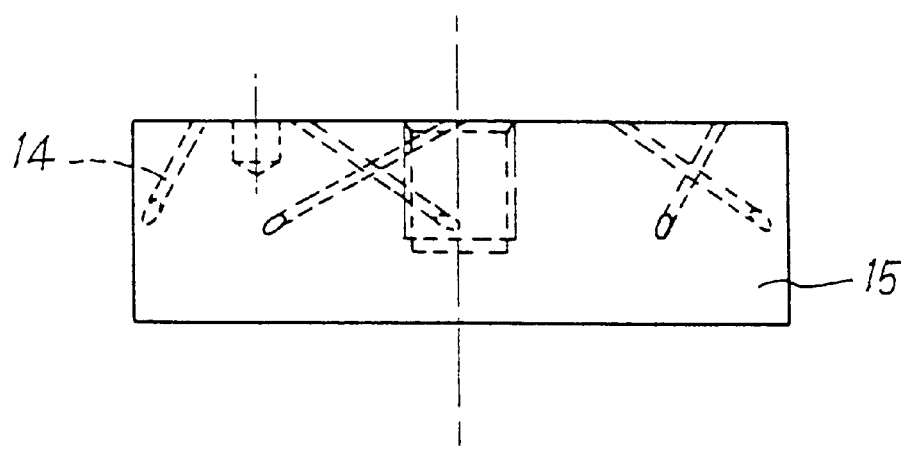
FIG_2B
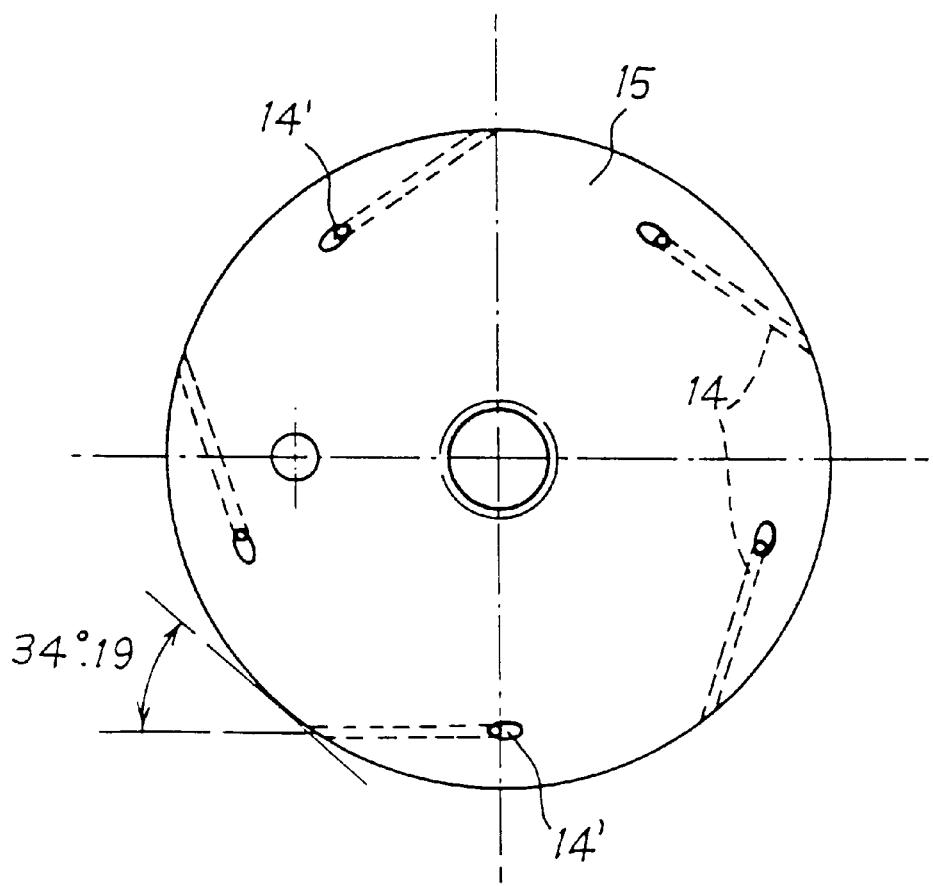
FIG_2C

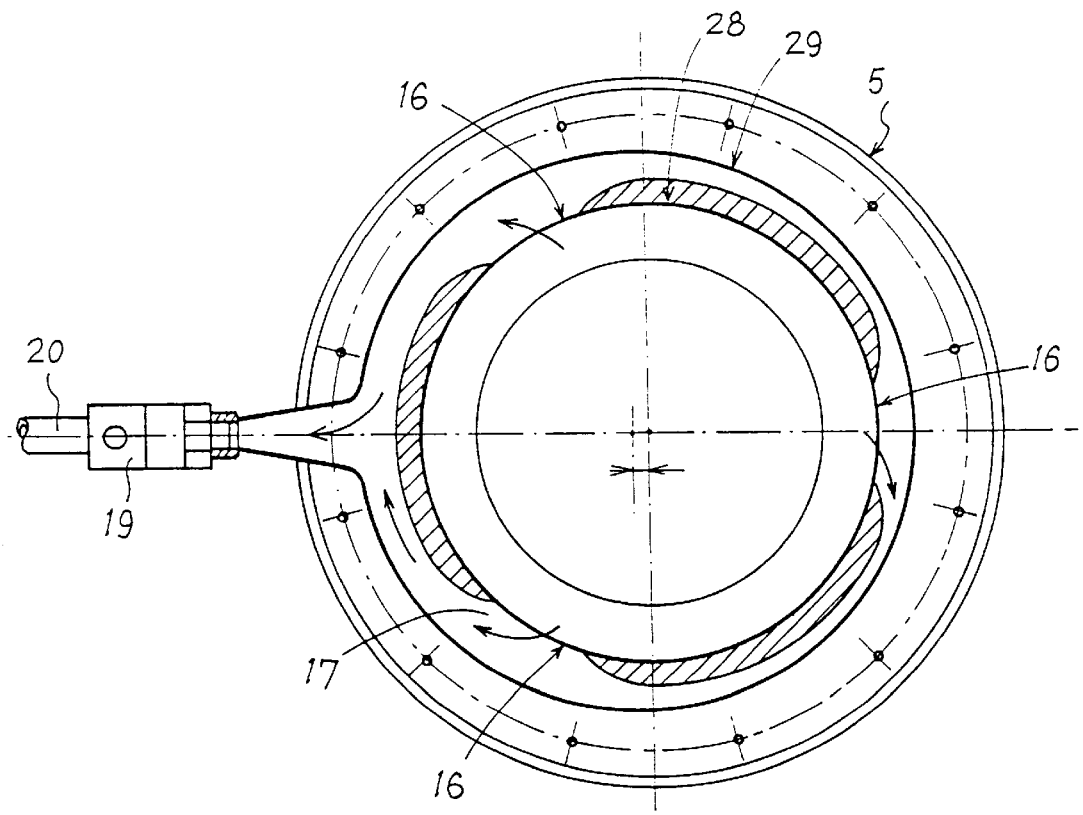
FIG_2d
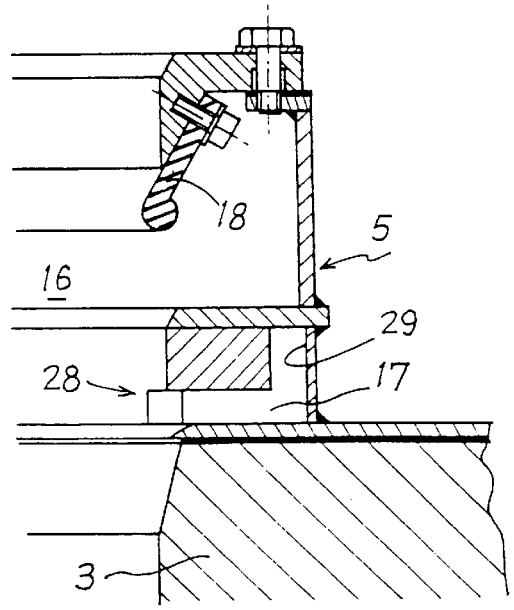
FIG_2e

COMPACTING MEANS AND DEVICE SUITABLE FOR THE COMPACTING OF MATERIALS WITH A PYROPHORIC TENDENCY

FIELD OF THE INVENTION

The present invention relates to:

a compacting process suitable particularly for the compacting of materials with a pyrophoric tendency and especially for the compacting of scrap metal generated in the nuclear industry; and compacting means, and a compacting device including said means, appropriate for the implementation of said process.

Said invention was designed and developed in the nuclear context. It will hereafter be described more particularly with reference to this context, but those skilled in the art will easily understand, on reading the following text, that in its principle—compacting of blanketed materials with a pyrophoric tendency, with optimized complementary external blanketing—said invention is applicable to other fields.

BACKGROUND OF THE INVENTION

The shells and end-pieces resulting from the chopping-up of irradiated nuclear fuel assemblies (said chopping process has been described especially in patent application EP-A-347 312) have hitherto been placed in the same drum, specific for this type of high level waste, on leaving their respective rinsers. They are then coated (as such) with a cement slurry, said slurry being poured into the drum until it is full. After a safety lid has been welded on, the filled drums are transferred directly to a storage facility.

In order to reduce the definitive storage volume of this waste considerably, it was decided to compact it. A proposed compacting process has been described especially in patent application WO-A-94/16449. The desired procedure is actually as follows:

fill an approximately 80 l cylindrical case with said waste;

compact said filled case with a press; and package this new type of compacted waste in a container of the same geometry as containers for vitrified fission products, which are called high level containers or HLC.

Compacting this type of waste with a pyrophoric tendency—which in fact consists of metallic materials capable of catching fire and/or exploding—creates genuine technical problems. For obvious safety reasons, the cases containing said waste must be compacted after obligatory drying and saturation with inert gas (internal blanketing), preferably in an inert atmosphere (external blanketing around said cases in the compacting skirt), with obligatory recovery of the gases which escape. These techniques of:

internal blanketing (saturation, with inert gas, of the case or container to be compacted, carried out at the drying station prior to compacting), and external blanketing (saturation, with inert gas, of the space around the case during compacting of the latter) with aspiration of the entrained dust, performed using inert gases such as nitrogen and/or argon, have been described by the Applicant in patent application WO-A-94/15775.

It is pointed out here, in passing, that any other blanketing technique, solid or liquid, is excluded because of the large quantities of inert materials required and because of the incompressibility of said materials. Inert gas is therefore used, the nature of said gas obviously being adapted to the type of pyrophoricity exhibited by the waste to be compacted.

It is also pointed out, for information, that the compacting device used comprises essentially:

a fixed block supporting the case or container to be compacted, a compacting skirt to be positioned with said case on said block, the purpose of which skirt is to guide the compacting means and prevent the case from expanding laterally during compacting (said skirt, mobile in translation, can already be loaded with the case to be compacted when it is brought into position on the block (technique described in patent application WO-A-94/16449) or said skirt, mobile parallel to the axis of the case, can be placed around the case after the latter has been positioned on said block), and compacting means capable of moving along the axis of the case and thus of compacting said case inside the compacting skirt, and that the compacting of the blanketed case with complementary external blanketing is carried out as detailed below.

The case cracks under the action of the pressure exerted by the compacting means (the characteristics of said case (nature of the constituent material, its thickness . . . ) have been optimized for this purpose of controlled cracking). The internal blanketing gas then escapes through the cracks generated, entraining pyrophoric dust, especially Zircaloy dust. It is imperative that said dust be recovered and carried away to an appropriate treatment unit. At the same time, accumulation of said dust inside the compacting skirt and dissemination thereof in the compacting cell must be avoided at all costs. Said dust is recovered using an aspirating device on top of the compacting skirt.

The aim of the complementary external blanketing is to reinforce the blanketing around the case during compacting, inasmuch as the rate of escape of the internal blanketing gas (initially contained in the case) is difficult to control. Said complementary external blanketing is effected with an injection nozzle and an aspirating pipe arranged above the compacting skirt. This type of complementary external blanketing system has been illustrated schematically in FIG. 2 of patent application WO-A-94/15775.

It has been found, however, that in such a configuration said external blanketing system does not effectively sweep the space situated between the compacting skirt and the assembly comprising the compacting means and the case (it would be more accurate to speak of the assembly comprising the case and the end of the compacting means which has entered said skirt).

SUMMARY OF THE INVENTION

Applicant propose an improved external blanketing technique which apparently improves the safety of the compacting process. More particularly the present invention provides a compacting process (and the associated means) with specific external blanketing, which process is carried out in such a way that:

before the end of the compacting means and the case to be compacted come into contact (inside the compacting skirt, prior to compacting), all the air present in the spaces between said case, said skirt and said compacting means is evacuated; and during compacting (action of the compacting means on the case to be compacted), all the dust generated is recovered.

There is no risk of dissemination of the dust during said process or thereafter (when the compacting skirt and compacted case are separated).

The process, compacting means and compacting device of the invention are now described, initially in general terms. They are then described in greater detail with reference to the attached Figures.

The invention therefore relates firstly to a compacting process suitable particularly for the compacting of materials with a pyrophoric tendency. Conventionally, in said process, a case or container, loaded with said materials and saturated with inert gas, is compacted in a compacting skirt by cooperation between a supporting surface, on which said skirt is positioned with said container, and compacting means arranged opposite said supporting surface and displaceable along a vertical axis, said compacting means having a lower end, the purpose of which is to enter said compacting skirt and come into contact with said container (in order to crush it).

Characteristically, within the framework of said process:
  with said lower end of said compacting means at least partially engaged in said compacting skirt before the latter comes into contact with said container, the air present in the spaces between said container, said compacting skirt and said compacting means is driven out by the blowing-in of inert gas, and
  when compacting is carried out by forcing said lower end of said compacting means onto said container, the spaces between said container, said skirt and said compacting means are swept by a stream of inert gas, said inert gas being conveyed via said compacting means and blown in through the lower end of said means, for these two successive blowing and sweeping operations.

The compacting according to the invention is thus carried out with novel external blanketing or, more precisely, with external blanketing comprising a novel means of supply. The inert gas used is conveyed via the compacting means and injected, at the upper face of the container to be compacted, through orifices produced directly in the lower end of said compacting means, in the lateral surface of said end.

The Applicant has demonstrated that the machining of these orifices through said end does not substantially affect its mechanical strength.

It is stated straightaway that, in one variant, said end does not in itself constitute an "independent" entity if the compacting means consist of a single part. In another variant, said compacting means result from the association of several parts joined together along their axis by a tie rod, said end consisting of the end part in this variant. Within the framework of this second variant, said compacting means can comprise a ram at whose lower end there is at least one bead.

The external blanketing of the process of the invention operates in two successive phases:
  A first phase referred to as the blowing-in of inert gas (before the compacting means come into contact with the upper face of the container to be compacted, prior to the start of compacting), the purpose of which is to drive out and evacuate the air present in the spaces between the compacting skirt, the container to be compacted and the compacting means (or, more precisely, their lower end introduced into said compacting skirt); and
  a second phase referred to as sweeping, this being the sweeping of the particle-laden gaseous effluents from the start of compacting and throughout its duration.

The first of said phases—the so-called blowing phase—is implemented after the end of the compacting means has engaged in the compacting skirt (the engagement being sufficient for the orifices, produced in the lower end of said compacting means, to be inside said skirt, the inert gas being blown in through said orifices), said compacting means continuing to descend until they come into contact with the upper face of the container to be compacted, or momentarily interrupting their descent just before they come into contact with the upper face of the container to be compacted. It is preferable to utilize this second variant, where the inert gas starts to be blown in when the travel of the compacting means is interrupted, i.e. generally when the lower end of said compacting means is a few millimeters from the upper face of the container to be compacted.

The inert gas blown in during this first phase of the external blanketing according to the invention drives out the air initially present in the spaces between the container, the compacting skirt and the compacting means. Said air must obviously be able to be evacuated. It is advantageously evacuated into the surrounding atmosphere (the atmosphere of a cell if compacting is carried out inside a cell) if said spaces are still in communication with said surrounding atmosphere through the base, i.e. if the compacting skirt has not yet made contact with the supporting surface (or block) for receiving the forces. This is a preferred variant of this first phase in which inert gas is blown in via the compacting means. Within the framework of this variant, said inert gas is blown into an open cavity, namely the spaces communicating with the outside through the base. It is in fact completely possible to create such an open cavity by synchronizing the positioning of the compacting skirt on the supporting surface with the blowing operation. Thus, in the case where the compacting skirt descends parallel to the axis of compacting in order to take up position around the container (already positioned on the block), it can be stopped in its descent for a few moments at a distance of a few centimeters from the supporting surface. With the skirt still "raised", the compacting means are lowered and the blowing operation can be started, with or without a dwell time. As soon as the air has been evacuated in this way, said skirt can complete its descent to take up a stable position on said supporting surface, and the sweeping and compacting can then be started together. This second phase of inert gas sweeping is described in detail further in the present text.

In the other case, where the compacting skirt, mobile in translation, arrives at the supporting surface already loaded with the container at the compacting station (process described in patent application WO-A-94/16449), it is also possible to blow the gas into an open cavity just before the cylinders bring said compacting skirt down onto said supporting surface.

It will be noted that, in the two cases (vertical or lateral displacement of the skirt), the compacting skirt is generally perfectly positioned on the supporting surface (or block) in the manner of a conical fit.

It is preferable to carry out the first phase (blowing) of the external blanketing according to the invention in an open cavity insofar as this method enables the air initially present to be driven out very efficiently. This expulsion will be all the more efficient if the inert gas is injected under pressure. In fact, within the framework of this preferred variant of the blowing operation (in an open cavity), a slight overpressure is advantageously created in said cavity by virtue of said blowing operation. For perfect control of said overpressure, it is preferable, as already indicated above, to carry out said blowing operation when the descent of the compacting means is interrupted, although this is not obligatory.

In the same way, implementation of this first phase (blowing) of the external blanketing according to the invention in a closed cavity, i.e. after the compacting skirt has been positioned on the supporting surface, is in no way excluded. In this variant, an appropriate aspirating device has to be provided in order to evacuate the air driven out and then the inert gas blown in. Whatever the case may be, such a device is used in the second phase (sweeping) of the external blanketing according to the invention. It is advantageously fixed on top of said compacting skirt. This blowing phase in a closed cavity (i.e. with aspiration) is also advantageously carried out in such a way as to create a slight overpressure in said cavity.

As already stated above, however, said blowing operation is preferably carried out in an open cavity when the compacting skirt has not yet come into contact with the supporting surface.

With said skirt positioned in contact with said supporting surface, and with the air initially present in the spaces between the container, the compacting skirt and the compacting means having been driven out (and replaced by inert gas blown in via said compacting means), the end of said compacting means comes into contact with the upper face of said container and crushes it. Compacting is thus effected by lowering said compacting means in said skirt. Throughout compacting the dust released must be carried away and recovered. For this purpose the external blanketing of the process of the invention enters its second phase:

inert gas, conveyed via the compacting means, is blown in through the end of said means (through orifices produced in their lateral surface) (in the same way as in the first phase); and said inert gas which has been blown in, and the inert gas initially present in the container (internal blanketing gas released by the crushing of the container), are recovered, laden with particles, by means of an aspirating device after they have swept all the spaces between said container, said skirt and said compacting means, the geometry of which spaces can vary during compacting.

It is understood that if it is not already operating during the first phase, said aspirating device must be started up as soon as the skirt has come into contact with the supporting surface, when inert gas is blown in. The sweeping operation is thus carried out in a closed cavity. To optimize the efficiency of said sweeping operation in said cavity (especially over the whole height of the annular space between the container, the compacting means and the compacting skirt), said aspirating device (connected to aspirating means) should be fixed to the compacting skirt.

It is furthermore advantageous to regulate the blowing-in and aspiration of the inert gas in this closed cavity in such a way that said closed cavity is maintained at a slight negative pressure (relative to the surrounding atmosphere). This improves the safety of the process by avoiding any dispersion of pyrophoric or other particles escaping from the container into the surrounding atmosphere (the atmosphere of the compacting cell if said compacting is carried out inside a cell).

The container and the pyrophoric materials therein are thus blanketed throughout their compacting phase.

When said compacting has ended, the compacting skirt is raised slightly, as are the compacting means with a view to their retraction. Prior to said retraction of the compacting means, the compacted container can be demolded in situ. When said demolding has ended, after retraction of the compacting means, the compacting skirt is raised completely.

In the variant of the process described in patent application WO 94/16449, after retraction of said compacting means, the compacting skirt, loaded with the compacted container, is transferred to the demolding station.

Irrespective of which variant of the compacting process is used (whether the compacting skirt is mobile in translation or mobile parallel to the axis of the container), when compacting has ended, generally once the compacting means have been raised above the compacting skirt, the inert gas supply is cut off.

Inert gas is therefore conveyed via the compacting means and blown in through said means during the two successive phases of the external blanketing according to the invention, said phases being termed blowing and sweeping respectively. Said inert gas is advantageously blown in continuously (without interruption) from the beginning of said blowing operation to the end of said sweeping operation. It is advantageously blown in at the same flowrate during these two successive phases. It is preferably blown in at the same flowrate from the beginning of the blowing operation to the end of the sweeping operation, without interruption.

As indicated previously, the external blanketing according to the invention can be carried out during the compacting of any material with a pyrophoric tendency, and especially during the compacting of containers filled with high level nuclear waste. In general it can be carried out inside a cell by remote control.

Those skilled in the art will have grasped the whole significance of the process of the invention, especially in the context of the compacting of high level nuclear waste with a pyrophoric tendency, using a compacting skirt mobile parallel to the axis of the container. The external blanketing carried out according to the invention guarantees safety and reduces contamination of the compacting cell. It minimizes contamination of the compacting skirt (contamination of the lining of said skirt).

The present invention relates secondly to compacting means useful especially for carrying out the compacting process described above. In fact, the framework of said process may not include the use of said compacting means.

Said compacting means, of the type ram, press or cylinder, conventionally have an end which enters a compacting skirt and comes into contact with the items to be compacted. Characteristically they have in their bulk at least one gas duct for leading gas into the vicinity of said end when they are in use. Said duct has the following openings:

for receiving its supply of said gas, an opening upstream of said end, in a part of the bulk of said compacting means which does not enter the compacting skirt during compacting; and for delivering said gas, an opening in the lateral surface of said end.

Said compacting means are generally displaceable along a vertical axis inside the compacting skirt. Over part of their height, they generally have a gas duct which divides, near their lower end, to open out into a series of orifices. Said orifices are advantageously distributed uniformly over the lateral surface of said lower end and their axis is advantageously orientated so that the gas is blown downwards. It is possible to attempt optimization of the circulation of the injected gas during compacting by optimizing the orientation of said orifices.

In particular, an attempt can be made to inject the gas as tangentially as possible in order to create a lateral stream of gas (for optimizing the sweeping operation described above) while at the same time minimizing the impact of the jets on the compacting skirt and preserving a good mechanical stability at the end of the compacting means under the force of the press.

As already stated, said compacting means can consist of a single part. They generally comprise a ram at whose lower end there is at least one bead. There can be two beads at the end of said ram, namely an intermediate bead and a so-called fixed bead, said intermediate bead, which acts as a "fuse" (breaking part), being located between said ram and said fixed bead. Said beads are removable and are made of a very hard material.

Said bead(s) is (are) joined to said ram by a tie rod. Within the framework of the present invention, the existing spaces between these different parts (ram—bead(s)—tie rod) are advantageously utilized to form passages or ducts for the gas which has to be delivered, during compacting, at the lower end ((fixed) bead) of the compacting means.

Within the framework of an advantageous variant of the invention, the tie rod used to join the different constituent parts of the compacting means has longitudinal grooves in its lower part. It has been machined in this way in order to provide the injected gas with circulation passages.

The invention relates finally to a compacting device useful especially for carrying out the compacting process described above, namely the compacting process with optimized external blanketing.

Said compacting device conventionally comprises:

a supporting surface or block;

a compacting skirt which takes up position, with the container to be compacted, on said supporting surface (it being possible for said skirt, mobile in translation, already to be loaded with the container when it arrives for positioning on said block, or for said skirt, mobile parallel to the axis of compacting, to be placed around the container after the latter has been positioned on said block); and means arranged opposite said supporting surface and displaceable along a vertical axis inside said compacting skirt.

Characteristically:

said compacting means have in their bulk at least one gas duct, as described above, so that, during compacting, gas can be conveyed inside them and delivered at their lower end; and said device also comprises, fixed to said compacting skirt, a gas aspirating device connected to aspirating means.

By associating the aspiration with the blowing operation, said device makes it possible to create the desired gas sweep (for evacuation of all the dust generated during compacting). Said device is connected to a system for treating the gaseous effluents, which can comprise a dust extractor in particular.

Said gas aspirating device principally consists of an annular chamber held on the skirt by a system which advantageously allows non-destructive removal and which is resistant to the process (in a nuclear context, resistant to irradiation). The inlet and interior of said chamber are advantageously optimized for best possible control of the evacuation rates of the particle-laden gas, which rates must remain very much greater than the minimum rate of entrainment of said particles so as to minimize or even prevent any deposition of said particles on the walls. For this purpose, said gas aspirating device can have in particular a variable suction area.

It is now proposed to describe the three aspects of the invention in greater detail with reference to the attached Figures.

BRIEF DESCRIPTION OF DRAWINGS

This description of said Figures is purely illustrative.

FIGS. 1a, 1b and 1c are block diagrams of the characteristic phases of the compacting process according to the invention (two successive phases of the external blanketing).

FIG. 2 is a vertical section of the compacting device according to the invention, showing essentially the compacting means (their lower end) and the aspirating device mounted on the compacting skirt.

FIG. 2a shows a detail of FIG. 2, namely the lower end of the compacting means.

FIGS. 2b and 2c are respectively a vertical view and a plan view of the end bead of said compacting means.

FIG. 2d shows in section (along $II_d$—$II_d$ of FIG. 2) the aspirating device mounted on the compacting skirt.

FIG. 2e shows the detail B of said aspirating device of FIG. 2.

DETAILED DESCRIPTION OF THE PRESENTLY PREFERRED EMBODIMENT

With reference to FIGS. 1a to 1c, there follows a description of the compacting process according to the invention (the variant illustrated is a preferred variant, where the compacting skirt, mobile parallel to the axis of compacting, is placed around the container after the latter has been positioned on the block).

The container 1, full of waste with a pyrophoric tendency, dried and saturated with inert gas (internal blanketing), has been brought to the compacting station on the block 2. Its position has been checked by means of sensors. The compacting skirt 3, which was in the raised position, resting on locks provided for this purpose, has been unlocked and lowered so as to engage around said container 1. Its descent has been stopped when its lower end is about 50 mm from said block 2. Provision is made for a few millimeters of space between the container 1 and the compacting skirt 3, thus forming an open cavity C.

The compacting means 4, which also were in the raised position, have also been lowered, after the compacting skirt 3. They are in fact lowered up to the point of engagement through the aspirating device 5 and are stopped when their lower end 15 is 5 millimeters from the upper face of the container 1. The device for blowing inert gas through said compacting means 4 is automatically started as soon as said compacting means 4 are in the correct position, as identified by an encoder. The air present in the open cavity C is thus driven out through the bottom (FIG. 1a).

The skirt 3 then finishes its descent to fit conically over the block 2. The movements of the compacting skirt 3, on the one hand, and of the compacting means 4, on the other, are actuated independently.

The aspirating device 5, the purpose of which is to evacuate the dust suspended in the annular space C' between the container 1, the skirt 3 and the compacting means 4 (C' being a closed cavity in this case), is then started, the blowing-in of inert gas being maintained in order to ensure that said annular space C' is swept efficiently (FIG. 1b).

Said dust is generated by the compacting which takes place as the compacting means 4 are lowered. As soon as the compacting pressure reaches a certain limit, cracks are generated in the walls of the container 1. The inert gas already present inside the container 1, together with dust (Zircaloy dust in the case of containers filled with waste resulting from the chopping-up of irradiated fuel assemblies), escapes through said cracks into the continuously swept cavity C'. The waste with a pyrophoric tendency is thus blanketed continuously throughout the entire compacting phase.

FIG. 1c illustrates the final position of the compacting means 4 inside the compacting skirt 3.

Said skirt 3 and said compacting means 4 then cooperate for the demolding of the compacted container 7 before being raised into their respective locking positions. The blowing operation and the aspiration through the aspirating device are stopped. The compacting cycle is complete. The compacted waste 7 is transferred for packaging in a definitive storage container (called a high level container (HLC) in the nuclear context).

The compacting means and compacting device according to the invention are now described with reference to FIGS. 2 and 2a to 2e.

This precise description includes technical specifications (dimensions) which are given by way of example in a practical context specific to the invention, namely the nuclear context.

In the first instance, with reference to FIGS. 2 and 2a to 2c, the compacting means, including the inert gas blowing device (blowing is symbolized by reference number 6), are described more particularly. Said compacting means 4 comprise a ram 4' at whose lower end there is an intermediate bead 11 and a fixed bead 15. These various parts are joined together by the tie rod 13.

The blowing device 6 comprises:
  a supply hose 9 connected to the inert gas dispensing unit (said hose has a length of 2 m and an internal diameter of 11 mm), and
  a connector 10 connecting said hose 9 to the orifices of the compacting means 4 (in the context of the Example, said connector 10 is a STAUBLI type, remote-handled connector of diameter 11 mm, suitable for use in a nuclear environment),
  said orifices passing through said compacting means 4 over part of their length.

These orifices, which form the inert gas ducts, correspond:
  * in the actual ram 4':
    to the holes 22 machined in the width of said ram 4' at the connector 10 level (two perpendicular holes of diameter 20 mm),
    to the space 23, a few millimeters in size, between the tie rod 13 and said ram 4', and
    to the grooves or passages 24 machined over the whole guide length of the tie rod 13 (see FIG. 2a) (six passages of about 6×12×100 mm);
  * at the contact between the ram 4' and the intermediate bead 11:
    to the "distribution chamber" 21 formed on the one hand by a shoulder machined on the tie rod 13, and on the other hand by an internal chamfer machined at the lower end of the bore of the ram 4', and
    to the "distribution chamber" 26 machined on the upper face of the intermediate bead 11;
  * in said intermediate bead 11:
    to the holes 12, with axes parallel to the axis of the tie rod 13, communicating with said chamber 26 (five holes of diameter 6 mm obtained by drilling at five equidistant points), and
    to the chambers 25 obtained by milling on the lower face of said intermediate bead 11, communicating with said holes 12 and opening out into the nozzles 14 (five chambers); and
  * in the fixed bead 15:
    to the injection system consisting of said nozzles 14 (holes machined in the form of nozzles) communicating with said chambers 25 and opening out at 14' in the middle of said fixed bead 15, on the lateral surface of the latter (see FIGS. 2b and 2c) (five nozzles of diameter 6 mm which form an angle of 30° with the horizontal so as to orientate the gas jets towards the bottom of the cavity C'); an angle of about 34° between the horizontal projection of the axis of the nozzles and the tangents to the circumference of the fixed bead 15 ensures a compromise between on the one hand the most tangential injection possible, for minimizing the impact of the jets 6 on the skirt 3 and creating a rotary movement of the injected gas, and on the other hand a good mechanical stability of said fixed bead 15.

By communicating with one another, these various orifices create the ducts through which the inert gas can flow.

Secondly, with reference to FIGS. 2, 2d and 2e, the aspirating device 5 is described more particularly. Said aspirating device 5 rests on the lining of the compacting skirt 3. It comprises:
  an annular aspiration chamber equipped with:
    three large aspiration orifices 16 whose suction area 17 is variable by virtue of an offset between the axis of the inner ring 28 (which is the same as the axis of the container) and that of the outer ring 29; said aspiration chamber is such that its minimum cross-section is almost diametrically opposite the aspiration inlet connected to the aspirating hose 20 (the lower face of the aspiration chamber is held on the skirt 3 by a system which allows non-destructive removal and is resistant to irradiation); and
    a gasket 18 (see FIG. 2e) (gasket of the Neoprene type with a Shore hardness of 60); said gasket ensures leak tightness between the chamber C or C' and the compacting means 4 over the entire displacement of said compacting means 4 in the compacting skirt 3;
  a connector 19 connecting said aspiration chamber to the aspirating hose 20 (in the context of the Example, said connector 19, like the connector 10 above, is a STAUBLI type, remote-handled connector of diameter 11 mm, suitable for use in a nuclear environment); and
  said aspirating hose 20 joined to the gaseous effluent treatment unit (said hose has a length of 2 m and an internal diameter of 19 mm).

With an external blanketing device of the invention, as shown in the attached Figures and with the above dimensions, the process of the invention was carried out, with nitrogen being blown in, for the compacting of containers filled with shells and end-pieces (originating from the chopping-up of irradiated nuclear fuel assemblies) and blanketed with argon (an inert gas heavier than air) at the drying station.

Said process was carried out under the following conditions in accordance with FIGS. 1a to 1c.

The nitrogen is conveyed via the compacting means and blown in at a flowrate of 8 l/s during the two successive blowing and sweeping phases, which are operated continuously.

During the first phase of blowing into the open cavity C, a flowrate of 2 l/s would suffice, although it is preferable to inject 8 l/s from the start; this simply improves the expulsion of the air from said cavity C and also makes it possible to preregulate said blowing operation before starting to aspirate (in order to sweep the closed cavity C').

This flowrate of 8 l/s results in nitrogen velocities of about 60 m/s at the outlet of the nozzles 14; this makes it possible to sweep the cavity C' efficiently and prevents any particles with a pyrophoric tendency from depositing therein (during compacting).

With this nitrogen flowrate of 8 l/s and the blowing device described above, an overpressure $P_s$ relative to the pressure in the cavity C', which is of the order of 0.1 to 1 bar upstream of the supply hose 9, makes it possible to compensate the pressure drops created inside the device. Said pressure drops are essentially at said hose 9 and immediately upstream of the injection nozzles 14. Said pressure drops therefore depend essentially on the length of said hose 9 and on the geometry of the nozzles 14 (diameter, angles).

As far as the aspiration is concerned, the quantity of gas arriving in the cavity C' must be entirely evacuated by the aspirating device 5, it being necessary for said cavity C' to be kept under a slight negative pressure. With a flowrate of 8 l/s, the minimum flowrate of entrainment of the particles (evaluated at 5.6 l/s) is comfortably exceeded and a good evacuation of the dust generated on compacting is guaranteed. With this flowrate and the aspirating device 5 described above for evacuating the dust, it is necessary to compensate the pressure drops and hence to create a negative pressure Pa in the extraction system (for example at the fan), said negative pressure depending on all the pressure drops and the magnitude of the negative pressure to be maintained in the cavity C'.

For this purpose provision is made for regulation between the negative pressure created by aspiration (at the end of the aspirating hose 20) and the overpressure created by blowing (at the beginning of the supply hose 9).

What is claimed is:

1. A high pressure compacting device for compacting a container loaded with solid pyrophoric waste material including dust particles able to disseminate when said compacting is carried out, said device comprising:

an upper end and a lower end, said lower end having a lateral surface and being configured for receipt in an opening defined in a compacting skirt in which the said container is disposed to be compressed and said upper end remaining outside said compacting skirt when said compacting is carried out; and at least one conduit extending from said upper end to the lateral surface of said lower end for communicating gas from outside to the lateral surface prior to said compacting being carried out and during said compacting.

2. A compacting device according to claim 1, wherein the compacting device is movable along a longitudinal axis of said compacting skirt, wherein said lower end of said compacting device has a plurality of orifices distributed circumferentially over the lateral surface of the lower end of said compacting device, said plurality of orifices being in fluid communication with said at least one conduit and configured to direct gas downwardly from the lower end of the compacting device.

3. A compacting device according to claim 1, wherein the compacting device is movable along a longitudinal axis of said compacting skirt, said compacting device including a ram, at least one bead, and a tie rod connecting axially to said ram and to said at least one bead so that said at least one bead is disposed at the lower end of the compacting device, and spaces existing between said ram, said at least one bead, and said tie rod form a portion of said at least one conduit.

4. A compacting device according to claim 3, wherein a lower part of said tie rod has a plurality of groves in fluid communication with said at least one conduit.

* * * * *